(12) United States Patent
Levy (10) Patent No.: US 6,424,448 B1
(45) Date of Patent: Jul. 23, 2002

(54) ANTIGLARE OPTICAL DEVICE

(76) Inventor: George Samuel Levy, Junes's Hallmark 3880 Valley Center Dr., San Diego, CA (US) 92130

(*) Notice: Subject to any disclaimer, the term of this patent is extended or adjusted under 35 U.S.C. 154(b) by 0 days.

(21) Appl. No.: 09/358,145

(22) Filed: Jul. 20, 1999

(51) Int. Cl.[7] .............................. G02F 1/01; G02F 1/03; G02B 26/00
(52) U.S. Cl. ...................... 359/240; 359/239; 359/238; 359/237; 359/259
(58) Field of Search .................................. 359/614, 613, 359/240, 239, 238, 237, 259

(56) References Cited

U.S. PATENT DOCUMENTS

| | | |
|---|---|---|
| 3,020,406 A | 2/1962 | Whitney |
| 3,714,430 A | 1/1973 | Finvold |
| 5,351,151 A | 9/1994 | Levy |
| 5,541,762 A | 7/1996 | Levy |
| 5,708,522 A | 1/1998 | Levy |
| 5,795,050 A * | 8/1998 | Smith .......................... 396/241 |

* cited by examiner

*Primary Examiner*—Georgia Epps
*Assistant Examiner*—Michael A. Lucas (57) ABSTRACT

An antiglare optical device for selectively attenuating bright light sources in an object field. This device comprises at the object end, the optics necessary for focusing incoming rays onto a focal plane, at the eyepiece end, the optics necessary to view the image of the object field, and at the focal plane, a photochromic layer for moderating rays originating from intense objects in the object field. A sharp focusing of the object field on the photochromic layer is achieved by means of asymmetrical optical components such as polarizing beam splitter and half lenses.

23 Claims, 7 Drawing Sheets

ANTIGLARE OPTICAL DEVICE

BACKGROUND OF THE INVENTION

Directing an optical instrument such as binoculars toward an intense light source such as the sun or a welding arc can be very hazardous to the eyes. In astronomical instruments, used to view an object field containing the sun, this problem is sometimes solved by placing, in the focal field of the instrument, an opaque disk positioned exactly at the focused image of the sun and thus blocks out the solar rays. In energy detection devices such as the ones described in U.S. Pat. No. 3,020,406 by T. R. Whitney and U.S. Pat. No. 3,714,430 by R. C. Finvold, a photochromic layer is placed at the focal plane of the device in order to protect sensitive photodetectors. The high energy rays causes the photochromic material or, equivalently system with a photochromic function, to increase in opacity at those points where the rays are most intense. Thus high intensity rays are attenuated by the same dark spots they generate, and dim rays are left unaffected. These prior devices make use of photochromic materials such as germanium or gallium arsenide, which are sensitive to infrared radiation. Theses devices are specifically designed to protect inanimate energy detectors and transducers.

Three other patents by G. S. Levy, extend the state of the art to the protection of the human eye. In U.S. Pat. No. 5,351,151, Levy describes the use of microlens array optics to achieve extreme compactness in optical instruments. His approach results in planar optics capable of selectively eliminating bright light sources. In U.S. Pat. Nos. 5,541,762 and 5,708,522, Levy describes the use of conventional optics, and in particular the application of prisms and mirrors in the design of compact antiglare devices. His devices fall into two main categories depending on whether the photochromic system is transmissive or reflective.

Figure 1A:
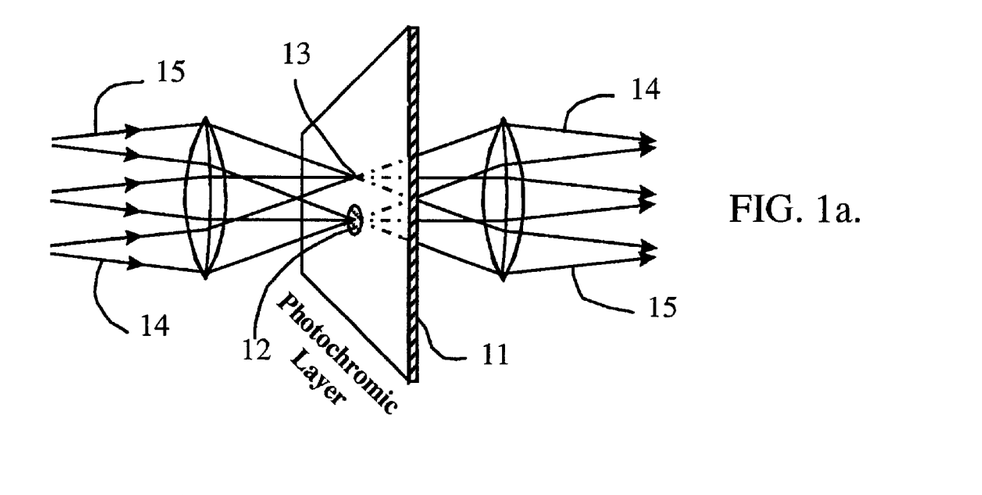
FIG. 1a illustrates the use of a photochromic system operating in transmission mode as described by Levy in U.S. Pat. Nos. 5,541,762 and 5,708,522.
Figure 1B:
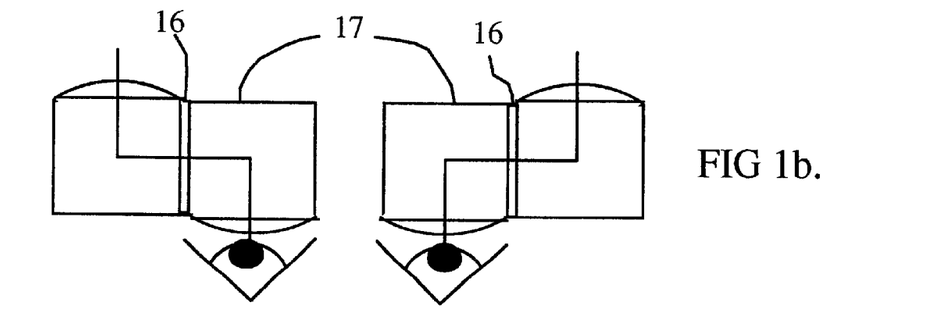
FIG. 1b provides an practical implementation of the antiglare idea expressed in FIG. 1a FIG. 1c shows a three dimensional configuration of the prism arrangement for FIG. 1b.
Figure 1C:
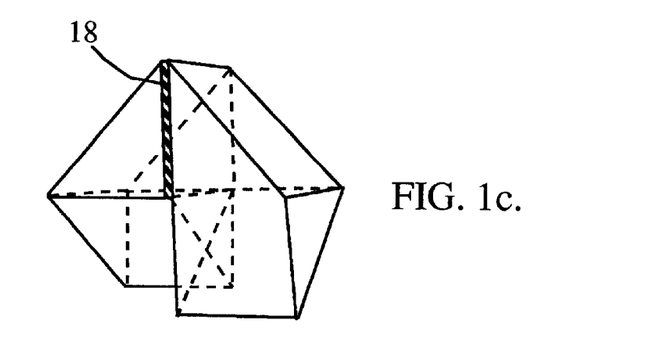

As shown in FIG. 1a, when the photochromic system 11 is transmissive, it is simply placed in the focal plane of the antiglare device. This layer darkens only at those spots where intense light is focused 12, and remains clear elsewhere 13. Since bright objects generate bright spots on the real image projected on the focal plane, the layer becomes dark at precisely those locations and therefore, bright rays 14 self attenuate. Dim rays 15 which traverse clear sections of the layer are left unaffected. The result is a clear field of view with only those bright spots attenuated. It is important for the bright objects to be sharply focused on the photochromic layer so that the mask they generate is well delineated. A practical implementation of such a concept is shown in FIG. 1b where the photochromic layer 16 is placed between the prisms 17 which fold the optical path to reduce the size of the device. FIG. 1c provides a three-dimensional view of the prism assembly for the left eye, showing the photochromic layer 18.

Figure 2A:
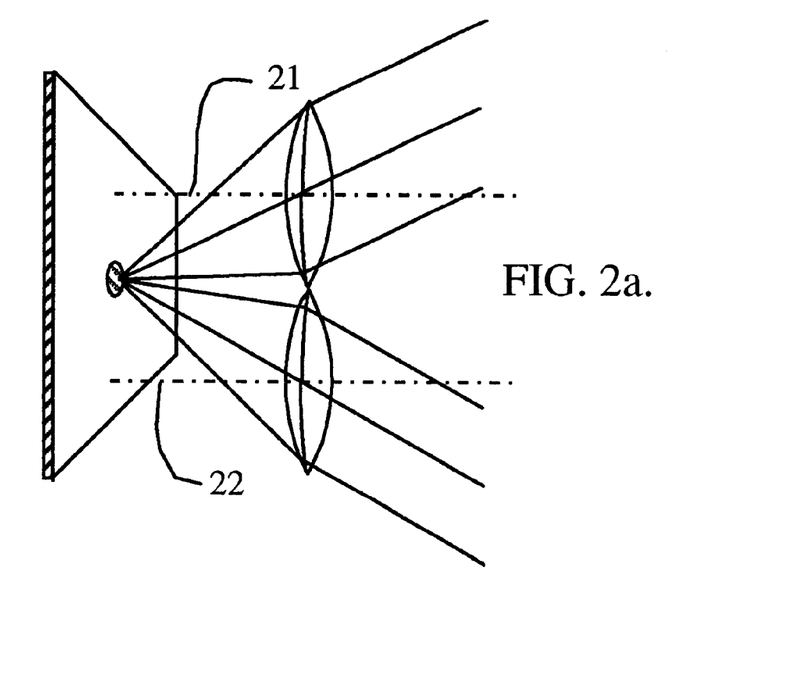
FIG. 2a describes the use of a photochromic system operating in reflection mode as described by Levy in U.S. Pat. Nos. 5,541,762 and 5,708,522 in which the optical axes between the incoming and outgoing rays are parallel but not congruent.
Figure 2B:
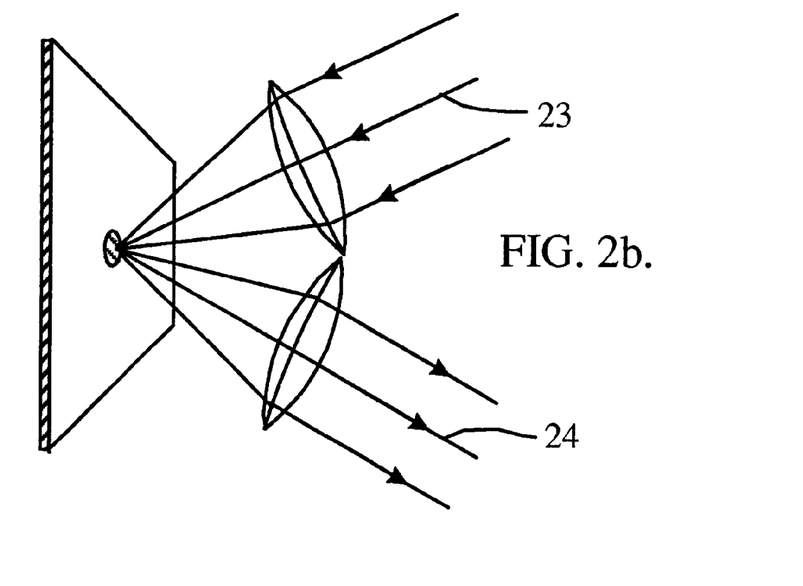
FIG. 2b illustrates the use of a photochromic system operating in reflection mode as described by Levy in U.S. Pat. Nos. 5,541,762 and 5,708,522 in which the optical axes between the incoming and outgoing rays coincide at the photochromic layer but are not parallel to each other and, therefore, not congruent.

When the photochromic system is reflective, it is placed in the focal plane of the device as shown in FIGS. 2A and 2b. In this case, however, a trade-off must be made: either, as shown in FIG. 2a, the axes 21 and 22 of both incoming and outgoing rays are made perpendicular to the photochromic layer but they cannot be coincident and therefore a significant portion of the image is cut off; or, as illustrated in FIG. 2b, the axes 23 and 24 are made to coincide at the photochromic layer but they cannot be perpendicular to it, and therefore it is much more difficult to obtain a proper focusing of the bright light sources on that system. Without proper focusing the opaque mask generated by bright rays does not match up perfectly well with those rays and therefore does not stop them completely.

It is an object of this invention to provide an antiglare device using a photochromic system that operates in reflective mode and in which the optical axis of the device is perpendicular to the photochromic layer, thus achieving proper focusing of the bright images on the photochromic system.

It is another object of this invention to provide an antiglare device that can be used in welding visors or goggles for eye protection against light generated by an electric arc It is yet another object of this invention to provide an antiglare device that can be used in binoculars, viewing scopes, rifle scopes, periscopes, and rearview mirrors for eye protection against high intensity light such as solar glare.

It is yet another object of this invention to provide an antiglare device that can be used in still as well as video cameras, to protect their photosensitive material from damage due to direct solar exposure, and to provide them with automatic contrast reduction and wider dynamic range.

SUMMARY OF THE INVENTION

This invention describes an antiglare device in which a photochromic system is placed at the focal plane of an optical system Bright rays create, at the focal plane, bright spots which force the photochromic systems to become dark at those same spots and therefore to attenuate the bright rays. The result is a clear field of view where only the bright objects ware dimmed. The photochromic system is maintained perpendicular to the optical axis by means of asymmetrical optical elements such as a polarizing beam splitter and half lenses, to allow the sharp focusing of the real image on the photochromic system, and in turn, the sharp delineation of the dark mask generated by the photochromic layer.

DETAILED DESCRIPTION OF PREFERRED EMBODIMENTS

The invention requires a reflective photochromic system to be inserted in the focal plane of an optical instrument. This system must become dark when light is intense and revert to its clear state when light is dim. Classical photochromic materials such as the glass known under the trade name "Photogray," and sometimes used in prescription glasses are too slow for the intended application. They rely on the reduction and crystallization of silver atoms in the presence of UV radiation and require several minutes to darken and close to half an hour to resume their clear state. An Optically Addressable Spatial Light Modulator (OASLM) is a planar device that requires a few milliseconds or even tenths of milliseconds to perform the photochromic function and therefore is the device of choice for this application.

The OASLM design is largely based on the "Hughes Aircraft light valve" originally described by Dr. William Blaha originally employed at Hughes Aircraft Corporation. The original Hughes Aircraft light valve is intended to amplify light: a weak light beam is directed on one side of the device and modulates a much stronger light beam reflected off the other side.

Figure 3:
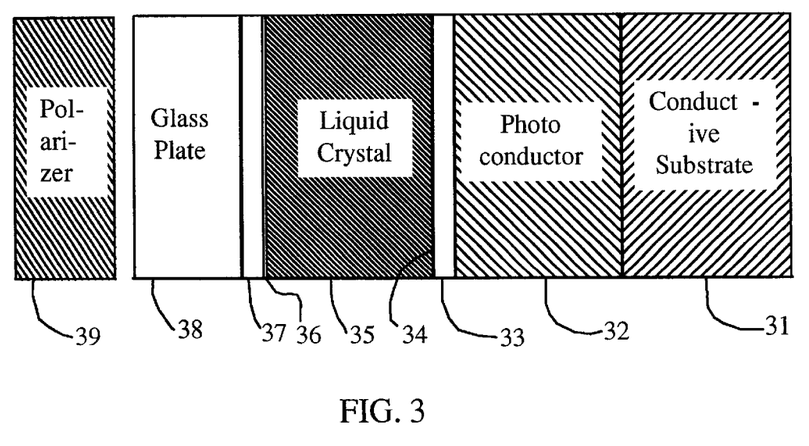
FIG. 3 describes a reflective photochromic system implemented by means of a liquid crystal layer in contact with a photoconductive material.

The version of OASLM of concern in this patent needs only one single active side as shown in FIG. 3. Its design is almost identical with the original Hughes Aircraft design except that the dielectric mirror is designed to be leaky thus allow some energy to leak through. Thus only one side of the device needs to be exposed to light. It comprises the following layers:

1. A conductive substrate 31
2. A photoconducting layer such as Silicon deposited on the conductive substrate 32
3. A leaky dielectric mirror consisting of multiple layers of materials with different indices of refraction 33
4. A liquid crystal alignment layer 34 deposited on the dielectric mirror
5. A liquid crystal layer 35
6. An alignment layer 36 deposited on
7. An ITO layer 37 deposited on
8. A glass plate substrate 38

This particular arrangement utilizes a nematic liquid crystal that rotates the plane of polarization of light and therefore, polarizers 39 must be used to achieve the photochromic function. Other possibilities include the use of ferroelectric liquid crystal if a high response speed is desired.

A voltage is applied across the device, between the conductive substrate 31 and the transparent ITO electrode 37. Incoming light is polarized and traverses the liquid crystal. A small fraction of the light penetrate the dielectric mirror and energizes the photoconductor. When light is intense, the charges generated in the photoconductor activate the liquid crystal which rotates the plane of polarization of incoming and reflected light by an amount totaling 90 degrees. Therefore, high intensity reflected light is stopped by the polarizer. Low intensity reflected light go through the polarizer unattenuated. Changes to the applied voltage modify the performance characteristics of the OASLM.

An alternative design that does not require polarizers, employs a liquid crystal known as a guest-host system, containing a dichroic dye which absorbs light in only one plane of polarization. For this particular application, the liquid crystal itself is used to polarize light only when a field is applied. Hence the dye molecules must be homeotropically (i.e. perpendicularly) aligned to the glass substrate in the absence of field. This can be accomplished by preparing the glass surfaces by rubbing or applying homeotropic surfactant or oxide alignment layers. When a field is applied, the molecules rotate and become parallel to the glass surface in the direction set by the preliminary preparation of the glass surface. To obtain this molecular response which is opposite to the usual one (as in liquid crystal watches for example), a liquid crystal with a negative dielectric anisotropy must be employed.

Liquid crystals can provide the required switching speed. For example, a commercial standard twisted nematic liquid crystal shutter can become opaque in about 3 milliseconds and transparent in approximately 20 milliseconds. Higher speeds can be achieved with ferroelectric liquid crystals.

Figure 4:
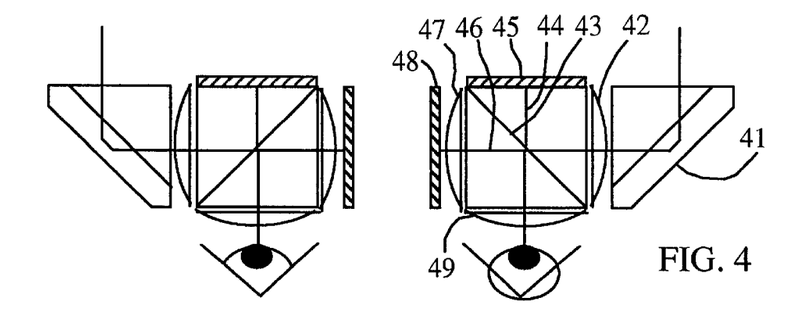
FIG. 4 illustrates a possible embodiment of the invention, making use of a polarizing beam splitter and a Amici roof prism.

A key idea underlying this invention is the use of an asymmetrical optical device that allows the optical axis of the rays moving toward the photochromic layer to coincide with the optical axis of the reflected rays. Thus, the photochromic layer can be reflective and can also be positioned exactly in the focal plane. FIG. 4 describes a possible embodiment of the invention that makes use of a polarizing beam splitter as the asymmetrical optical device. . Light rays enter the device through the Amici roof prism 41 in which they are inverted, reverted and deviated by 90 degrees. They then traverse a convex lens 42. On their way to the focal plane, the rays then traverse a polarizing beam splitter 43 where they are divided into two beams of perpendicular polarization. The first, which is the reflected beam 44 is directed into a black absorbing material 45. The second beam 46 continues in a straight line on its way to the focal plane which contains a field lens 47 and an OASLM 48. In this particular application the OASLM makes use of a nematic liquid crystal. Bright objects in the field of view generate bright spots on the OASLM. The effect of the OASLM is critical to the operation of the device. At those locations where light is dim the OASLM rotates the polarization of the reflected light by 90 degrees. At those locations where light is bright the OASLM does not alter the plane of polarization of the light. The reflected light then returns to the polarizing beam splitter where the fate of the light depends on its polarization. If the light is dim, the polarization has been rotated by 90 degrees by the OASLM, and therefore, the light is reflected by the beam splitter toward the eyepiece 49 where an upright image is displayed.

Otherwise, if the light is bright, the polarization has not been altered by the OASLM, and, therefore, the rays traverse the beam splitter without being reflected. The result is that only dim rays can reach the eyepiece. Taken together, the polarizing beam splitter and the OASLM behave as if they had a photochromic function.

Several variations to this basic design are possible.

Figure 5:
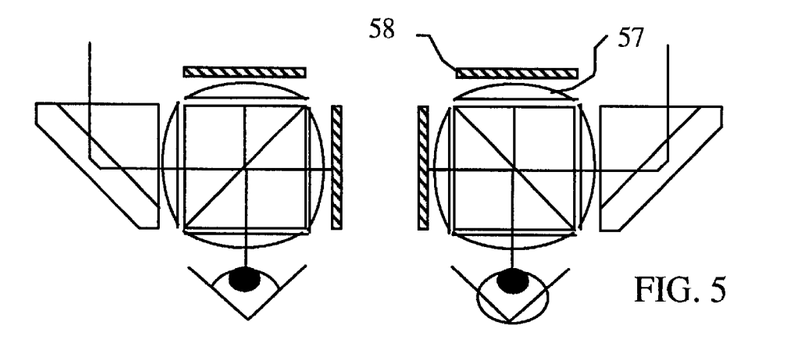
FIG. 5 describes how both branches originating from the polarizing beam splitter can be utilized to double the amount of light available to the eyes of the user.

More light could be made to reach the eyepiece by using two OASLMs located on two sides of the polarizing beam splitter. The black absorbing material 45 shown in FIG. 4 can be replaced by a second field lens 57 and a second OASLM 58 as illustrated in FIG. 5. In this configuration, each branch coming out of the beam splitter is equipped with its own focusing lens and photochromic layer. The result is double light intensity at the eyepiece. In theory, no light is lost in the polarization process since both output branches of the beam splitter are utilized.

Figure 6:
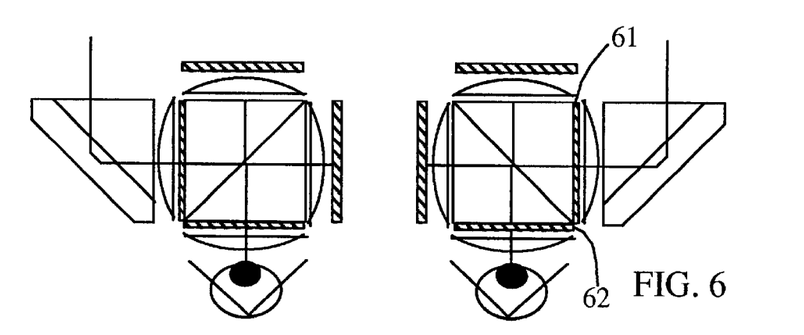
FIG. 6 shows how planar polarizers can be added on the sides of the polarizing beam splitter to extend its functionality.

FIG. 6 describes how the functionality of the polarizing beam splitter could be extended by supplementing it with two polarizers. Typical Off-The-Shelf polarizing beam splitter have a limited acceptance angle. That is, they can operate in the "polarization-beam-splitting" mode only when the rays do not deviate too much from the optical axis. In addition, even when the rays fall within the acceptance angle, their polarization characteristics may be poor. The design shown in FIG. 6 is intended to remedy the shortcoming of the polarizing beam splitter by inserting conventional polarizers on the object side 61 and on the eyepiece side 62 of the device. Such a design could therefore operate even if the beam splitter is conventional, that is even if it could split the beam without having any polarization capability.

Figure 7:
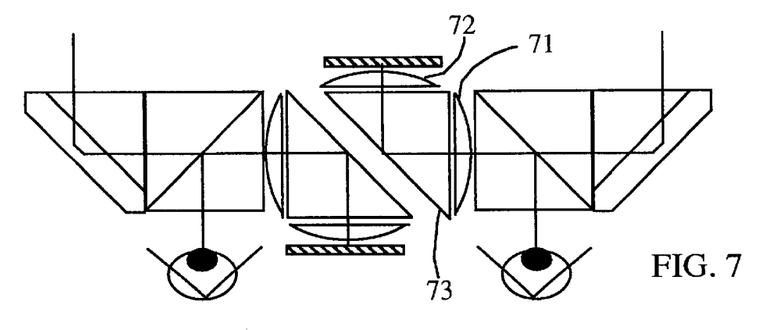
FIG. 7 illustrates how the number of lenses can be decreased and the requirement by the polarizing beam splitter, for high acceptance angle can be reduced by performing the focusing function outside the confine of the beam splitter.

FIG. 7 shows a possible design in which the number of lenses has been reduced by combining the object lens with the eyepiece lens through the beam splitter, in effect moving the polarizing beam splitter on the object side of the device. Only two lenses are required. The first is the object/eyepiece lens 71 and the second is the field lens 72. To improve compactness, a right angle prism 73 is used to fold the optical path. In addition, to conserve space, the optical path is folded upward for the right eye device and downward for the left eye device.

Figure 8:
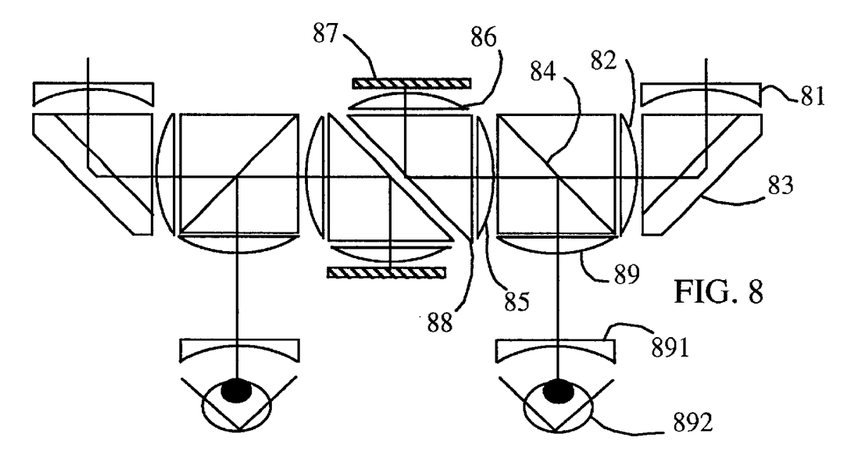
FIG. 8 describes how the requirement by the polarizing beam splitter, for high acceptance angle can be reduced by using optical means to shrink the angular range of the rays going through the polarizing beam splitter.

FIG. 8 illustrates how optical means can be used to reduce the angular deviation of the rays from the optical axis and therefore extend the functionality of the polarizing beam splitter. A Galileo telescope comprised of the lenses 81 and 82 and operating in a reverse manner to achieve a magnification less than one, that is with the concave lens at the object end and the convex lens at the eyepiece end, is used to reduce into the polarizing beam splitter, the angular diversity of the incoming rays. The rays enter the system through the concave lens 81 and follow a path folded by the roof prism 83 and reach the convex lens 82. At that point, as they enter the polarizing beam splitter 84 their deviation from the optical axis has been reduced by the demagnification of the reverse Galileo telescope. They pursue their course through the beam splitter and then enter convex lens 85 which focuses them onto the field lens 86 and the OASLM 87. The rays are folded by the right angle prism 88 to conserve space. As they reach the OASLM they are selectively attenuated according to their intensity. They are then reflected through the field lens 86 and the focusing lens 85. They reenter the beam splitter 84 where, because of their rotated polarization, they are reflected at a 90 degree angle toward the user. They exit the beam splitter and enter a conventional Galileo telescope which restore the magnification of the system to unity. This telescope comprises of convex lens 89 and concave lens 891. The rays leaving the lens 891 enter the eyes of the user 892.

Figure 9:
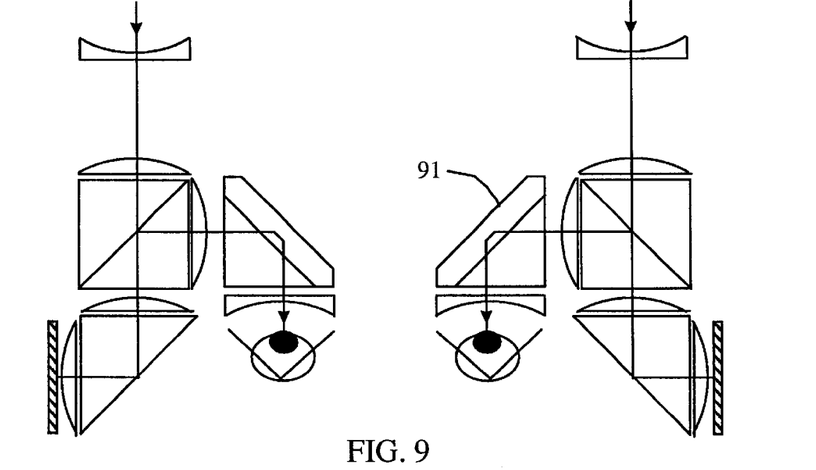
FIG. 9 provides a possible design variation for the idea presented in FIG. 8, in which the optical elements are arranged differently.

FIG. 9 describes a variation of the idea introduced in FIG. 8. All the elements of the design are still there but have been shifted in position to make the device more compact. The roof prism 91 is now close to the eyepiece. The shape of the resulting design may be more suitable to be wrapped around the head of the user.

Figure 10:
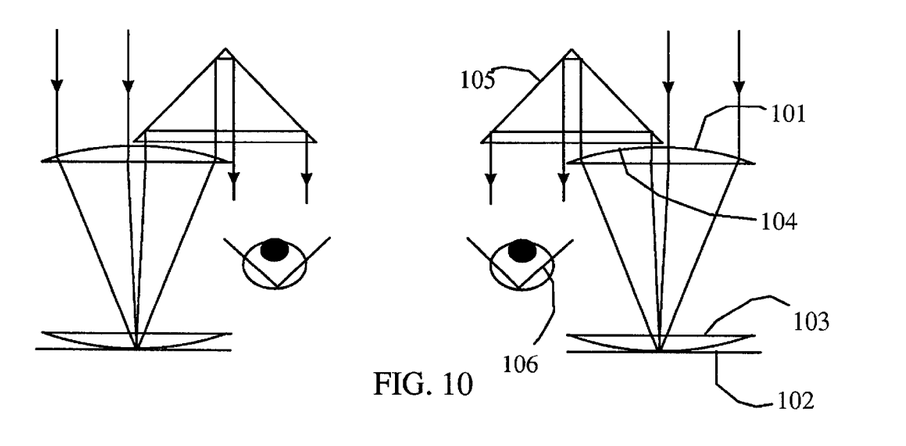
FIG. 10 shows how the optical axis can be made to be perpendicular to the photochromic layer by means of asymmetrical optics, more particularly by using half of a lens for incoming rays and the other half for outgoing rays.

FIG. 10 describes a design that could easily be made to wrap around the user's head. Light enters the system through one half of a large lens 101 which acts as an object lens and is then focused on the photochromic layer 102 through a field lens 103. After undergoing selective attenuation according to which only the brightest rays are dimmed, the light is reflected off the photochromic layer and goes through the field lens a second time. They traverses the other side of the lens 104. The rays are then inverted and reverted by a corner reflector 105 and directed toward the user's eyes 106. The angle between the faces of the corner reflector could be slightly adjusted, and of the photochromic layer could be placed slightly off perpendicular with respect to the incident rays, to increase the separation between the left and right devices and thus allow more room for the user's head.

Figure 11A:
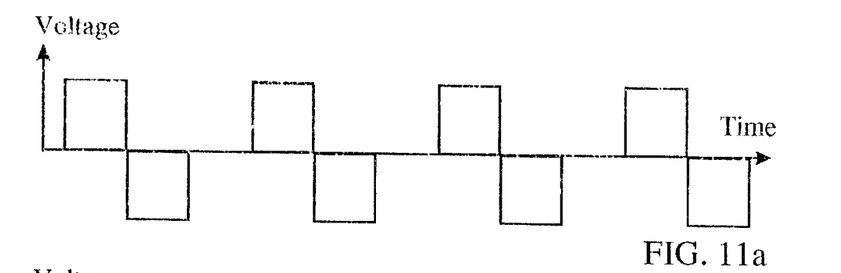
FIG. 11a–FIG. 11d show how a polarizing beam splitter can be used to design an antiglare device in which the photochromic system is perpendicular to the optical axis.
Figure 11B:
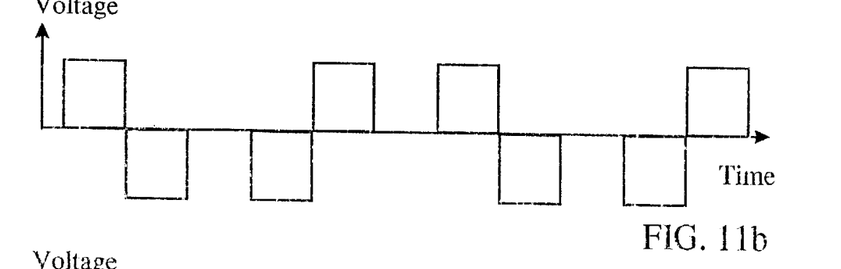
Figure 11C:
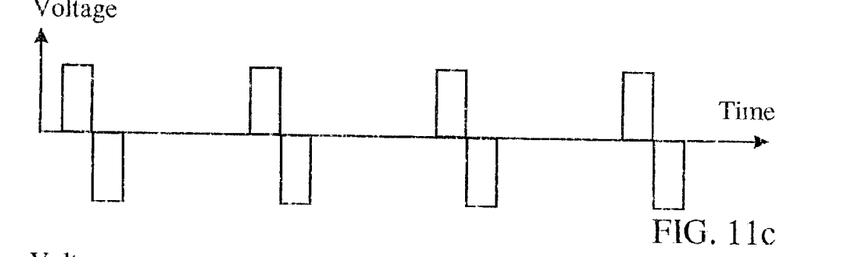
Figure 11D:
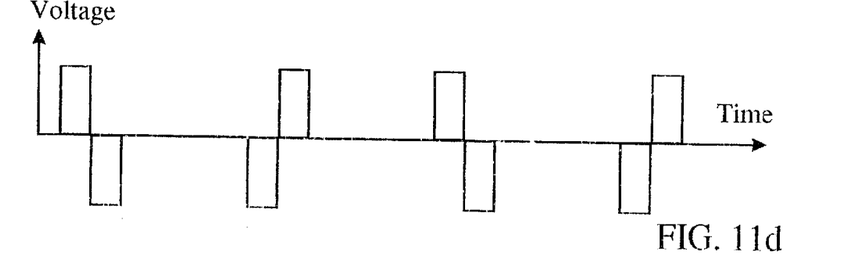

The darkness of the mask dynamically generated by the bright rays in the OASLM which behaves as a photochromic system, can be adjusted by a variety of means, such as adjusting the voltage or changing the duty ratio of the signal driving the OASLM. FIGS. 11a and 11b illustrates two possible such signals. They consists of three levels: positive, ground and negative. To avoid electrolysis of the liquid crystal, the DC component is zero. The darkness of the mask can be increased by reducing the duty ratio of the signal. In this case, for example, this would correspond to lengthening the duration of the ground level at the expense of the positive and negative levels as shown in FIGS. 11c and 11d.

The photochromic function can be performed by inserting into the focal plane an Electrically Addressable Spatial Light Modulator (EASLM) and driving this device with a video signal corresponding to the field being viewed. An EASLM is typically a liquid crystal display device mounted on top of an overhead projector and connected to a computer. If the polarity of the electronic signal is inverted such that the EASLM is opaque when the light is intense, and if the image generated by the EASLM coincides with the image focused by the optics, then the EASLM behaves as if it had a true photochromic function.

Application for such antiglare device include welding goggles, binoculars, space suit goggles, video and still cameras, rearview devices for cars.

While the above description contains many specificities, the reader should not construe these as limitations on the scope of the invention, but merely as exemplifications of preferred embodiments thereof. Those skilled in the art will envision many other possible variations within its scope. Accordingly, the reader is requested to determine the scope of the invention by the appended claims and their legal equivalents, and not by the examples which have been given.

I claim:

1. An antiglare optical device for selectively attenuating bright light sources in an object field, said device comprising
   a) a focusing optical means for focusing onto a focal plane, incoming rays originating from objects in said object field, thus forming an image of said object,
   b) an eyepiece means for viewing a portion of said image,
   c) A moderating photochromic layer located at said focal plane for moderating rays originating from said intense light source,
   d) An asymmetrical optical system for allowing the optical axis of said rays going toward said photochromic layer to be identical with the optical axis of said rays after they have interacted with said photochromic layer.

2. A device as in claim 1 wherein said asymmetrical optical component is comprised of a polarizing beam splitter.

3. A device as in claim 2 wherein said polarizing beam splitter divides said incoming rays into two branches, each said branch being equipped with its own said focusing mean, and its own said photochromic layer.

4. A device as in claim 2 wherein said polarizing beam splitter is located on the object side of said focusing means.

5. A device as in claim 2 wherein an optical lens arrangement is used to shrink the angular range of said incoming rays.

6. A device as in claim 2 wherein said optical arrangement comprises on the object side of said device, an inverted Galilean telescope, positioned such that said incoming rays first traverse a concave lens, and then traverse a convex lens, thus providing demagnification of said object field.

7. A device as in claim 2 wherein said optical arrangement comprises on the object side of said device, a conventional Galilean telescope, positioned such that said incoming rays first traverse a convex lens, and then traverse a concave lens, thus providing magnification of said object field.

8. A device as in claim 2 wherein the 90 degree deviation caused by said polarizing beam splitter and the inversion caused by said focusing means, is corrected by means of a roof prism.

9. A device as in claim 1 wherein said asymmetrical optical component is comprised of a beam splitter and of two polarizers, first said polarizer located on the object side of said device, and second said polarizer located on the eyepiece side of said device, said first and second polarizers oriented such that their angle of polarization are perpendicular.

10. A device as in claim 1 wherein asymmetrical optical component is merged with the focusing means, such that said incoming rays traverse a first portion of said focusing means, are reflected by said photochromic layer and return through second portion of said focusing means.

11. A device as in claim 10 wherein a comer reflector is placed on the path of said rays to allow viewing of said object field in the forward direction.

12. A device as in claim 1 wherein photochromic layer comprises a liquid crystal layer.

13. A device as in claim 1 wherein photochromic layer comprises a guest-host liquid crystal system.

14. A device as in claim 1 wherein photochromic layer comprises a liquid crystal layer display operating in transparency mode, said display being controlled by a video signal generation means to provide images to said display.

15. A device as in claim 14 wherein the video image generated is aligned and is the negative of, the image focused by said focusing optical means.

16. A device as in claim 1 wherein said device is fabricated in the shape of welding goggles.

17. A device as in claim 1 wherein said device is fabricated in the shape of binoculars and capable of magnification.

18. A device as in claim 1 and further comprising an adjusting means for adjusting the operation of said photochromic layer by means of an electrical input.

19. A device as in claim 1 wherein said photochromic layer is implemented by means of a optically addressable spatial light modulator.

20. A device as in claim 1 wherein said rays are folded by optical reflective means.

21. A device as in claim 1 wherein the effect of said moderating reflective photochromic layer is controlled by adjusting the shape of the amplitude versus time function of the electrical driving signal.

22. A device as in claim 1 wherein photochromic layer comprises a liquid crystal layer that contains a dye.

23. An antiglare optical device for selectively attenuating bright light sources in an object field, said device comprising
  a) a focusing optical means for focusing onto a focal plane, imcoming rays originating from objects in said object field, thus forming an image of said object,
  b) an eyepiece means for viewing a portion of said image,
  c) A moderating reflective photochromic layer located at said focal plane for moderating rays originating from said intense light source,
  d) An asymmetrical optical system for allowing the optical axis of said rays going toward said photochromic layer to be indentical with the optical axis of said rays reflected off said photochromic layer.

* * * * *